United States Patent [19]
Tsuchiya

[11] Patent Number: 5,258,861
[45] Date of Patent: Nov. 2, 1993

[54] REFLECTION TYPE HOLOGRAM SCALE

[75] Inventor: Hideki Tsuchiya, Kanagawa, Japan

[73] Assignee: Sony Corporation, Tokyo, Japan

[21] Appl. No.: 833,751

[22] Filed: Feb. 11, 1992

[30] Foreign Application Priority Data

Feb. 19, 1991 [JP] Japan .................. 3-024679

[51] Int. Cl.⁵ .................. G02B 5/32; G02B 5/18; G01B 11/00
[52] U.S. Cl. .................. 359/15; 359/1; 359/507; 359/572; 356/356; 250/237 G
[58] Field of Search ........... 359/436, 507, 511, 513, 359/514, 572, 576, 2, 1, 15; 283/86; 356/356, 373; 250/237 G

[56] References Cited

U.S. PATENT DOCUMENTS

| | | | |
|---|---|---|---|
| 3,552,853 | 1/1971 | Sanders | 283/86 |
| 4,014,602 | 3/1977 | Ruell | 359/2 |
| 4,112,295 | 9/1978 | Dubik et al. | 356/395 |
| 4,676,645 | 6/1987 | Taniguchi et al. | 356/356 |
| 4,818,045 | 4/1989 | Chang | 359/15 |
| 4,930,895 | 6/1990 | Nishimura et al. | 356/356 |
| 4,979,826 | 12/1990 | Ishizuka et al. | 356/356 |
| 5,050,993 | 9/1991 | Tansey | 356/356 |

FOREIGN PATENT DOCUMENTS

| | | | |
|---|---|---|---|
| 61-6782 | 1/1986 | Japan | 359/2 |
| 61-176969 | 8/1986 | Japan | 359/2 |
| 62-153993 | 7/1987 | Japan | 359/2 |
| 63-75518 | 4/1988 | Japan | . |

Primary Examiner—Bruce Y. Arnold
Assistant Examiner—David R. Parsons
Attorney, Agent, or Firm—Lewis H. Eslinger; Jay H. Maioli

[57] ABSTRACT

A reflection type hologram scale, in which a hologram dry plate is bonded to a protecting base member in which a hologram grating formed on a scale base member forming the hologram dry plate and a reflecting film formed on a base member forming the protecting base member are opposed to each other. Therefore, the hologram grating and the reflecting film are both protected by the scale base member and the base member so that the hologram grating and the reflecting film are prevented from being exposed to the air, thereby preventing the hologram grating and the reflecting film from being smudged by fingermarks, dust and also from being scratched.

4 Claims, 1 Drawing Sheet

REFLECTION TYPE HOLOGRAM SCALE

BACKGROUND OF THE INVENTION

1. Field of the Invention

The present invention generally relates to hologram scales and, more particularly, to a reflection type hologram scale suitably applied to a moving amount detecting apparatus, a measuring machine or a displacement measuring apparatus, for example.

2. Description of the Prior Art

Conventionally, hologram scales are utilized in an optical, precision displacement measuring apparatus. Japanese Laid-Open Patent Publication No. 63-75518, for example, describes one of such hologram scales. This type of hologram scale will be described below.

FIG. 1 of the accompanying drawings shows an example of a conventional reflection type hologram scale in which diffracting slits 32 are provided on one surface of a glass substrate 31 at an equal pitch and an evaporated mirror 33 is provided on the other surface of the glass substrate 31.

In the prior-art reflection type hologram scale shown in FIG. 1, the diffracting slits 32 and the evaporated mirror 33 are both exposed to the air so that the diffracting slits 32 are smudged by fingermarks, dust, liquid or the like and that the evaporated mirror 33 is easily scratched.

When the diffracting slits 32 are smudged by fingermarks, dusts or liquid and so on or when the evaporated mirror 33 is scratched, then a diffracted light is not produced by a light incident on the diffracting slits 32 or a primary diffracted light incident on the glass substrate 31 is not reflected by the evaporated mirror 33 with the result that the displacement cannot be measured. Further, when fingermarks, dust, liquid or the like on the diffracting slits 32 are removed, then the diffracting slits 32 are easily scratched.

OBJECTS AND SUMMARY OF THE INVENTION

Therefore, it is a general object of the present invention to provide an improved reflection type hologram scale in which the aforesaid shortcomings and disadvantages of the prior art can be eliminated.

An object of the present invention is to provide a reflection type hologram scale in which a hologram grating and a reflecting film can be prevented from being smudged by fingermarks, dusts and also from being scratched.

As a first aspect of the present invention, a reflection type hologram scale is comprised of a hologram dry plate, in which a hologram grating is formed on a scale base member, and a protecting base member, in which a reflecting film is formed on a base member, wherein when the hologram dry plate is bonded to the protecting base member, the surface of the hologram dry plate on which the hologram grating is formed is bonded to the surface of the protecting base member on which the reflecting film is formed.

In accordance with a second aspect of the present invention, a reflection type hologram scale is comprised of a hologram dry plate, in which a reflecting film is formed on a scale base member, a sensitive layer, is formed on the reflecting layer and a hologram scale is formed on the sensitive layer, and a protecting base member, wherein when the hologram dry plate is bonded to the protecting base member, the surface of the hologram dry plate on which the hologram grating is formed is bonded to to the protecting base member.

According to the reflection type hologram scale of the first embodiment of the present invention, since the hologram dry plate and the protecting base member are bonded while the hologram grating formed on the scale base member forming the hologram dry plate and the reflecting film formed on the base member forming the protecting base member are opposed to each other, the hologram grating and the reflecting film are protected by means of the scale base member and the base member. Therefore, the hologram grating and the reflecting film are prevented from being exposed to the air, whereby the hologram grating and the reflecting film are protected from fingermarks, dust and scratches.

Further, according to the reflection type hologram scale of the second embodiment of the present invention, since the reflecting film is formed on the scale base member forming the hologram dry plate and the protecting base member is bonded to the hologram grating formed on the reflecting film, the hologram grating and the reflecting film are protected by the scale base member and the protecting base member. Therefore, the hologram grating and the reflecting film are prevented from being exposed to the air, thereby protecting the hologram grating and the reflecting film from fingermarks, dust and scratches.

The preceding and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF PREFERRED EMBODIMENTS

The present invention will now be described with reference to the drawings.

Figure 1:
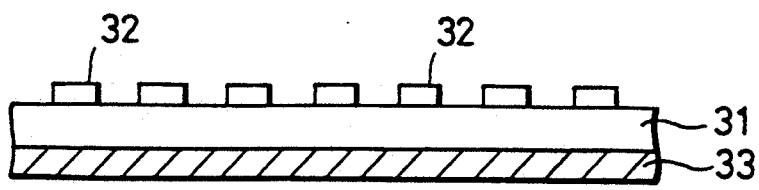
FIG. 1 is a cross-sectional view illustrating a part of a reflection type hologram scale according to the prior art.
Figure 2:
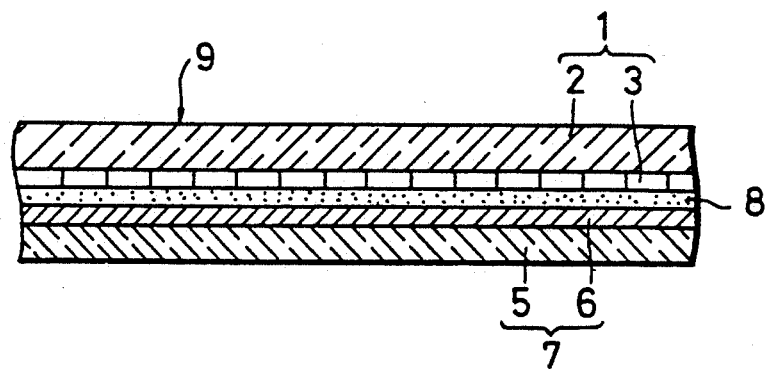
FIG. 2 is a cross-sectional view illustrative of a structure of a main portion of a first embodiment of a reflection type hologram scale according to the present invention.

FIG. 2 of the accompanying drawings shows a cross-sectional view of a part of a structure of a hologram scale according to a first embodiment of the present invention. As shown in FIG. 2, a hologram dry plate 1 includes a scale base member 2 made of a transparent material such as glass or the like. A photosensitive layer is coated on the scale base member 2, interference fringes are exposed and recorded on this sensitive layer and then a hologram grating 3 is formed in the sensitive layer by developing the sensitive layer.

A reflecting film 6 made of aluminum (Al) or chromium (Cr) and so on is formed on a base member 5 made of a suitable material such as glass, metal, plastics or the like, thereby a protecting base member 7 being produced.

Then, a reflection type hologram scale 9 is produced by bonding the hologram grating 3 of the hologram dry plate 1 to the reflecting film 6 of the protecting base member 7 with a transparent bonding agent 8. A refractive index of the bonding agent 8 is selected to be substantially the same as that of glass or the like.

In the reflection type hologram scale 9 thus produced in the first embodiment of FIG. 2, the hologram grating 3 and the reflecting film 6 are respectively protected by the scale base member 2 and the base member 5 so that the hologram grating 3 and the reflecting film 6 are prevented from being exposed to the air, thus preventing the hologram grating 3 and the reflecting film 6 from being smudged by the fingermarks and dust and also from being scratched.

When the first embodiment of FIG. 2 is implemented, a radiation light becomes incident on this reflection type hologram scale from the scale base member 2 side.

Figure 3:
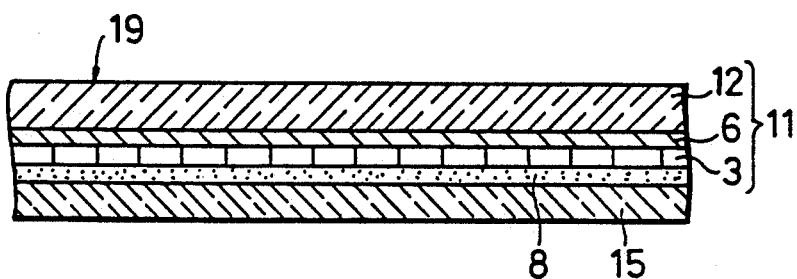
FIG. 3 is a cross-sectional view illustrative of a structure of a main portion of a second embodiment of the reflection type hologram scale according to the present invention.

FIG. 3 is a cross-sectional view illustrative of a part of a structure of the reflection type hologram scale according to a second embodiment of the present invention. In FIG. 3, like parts corresponding to those of FIG. 2 are marked with the same references and therefore need not be described in detail.

Referring to FIG. 3, it will be seen that a hologram dry plate depicted by reference numeral 11 includes a scale base member 12. The scale base member 12 might be made of a suitable material such as glass, metal, plastics or the like and the material of the scale base member 12 need not always be transparent. The reflecting film 6 is formed on the scale base member 12 and the sensitive layer is coated on the reflecting film 6. After the interference fringes are exposed and recorded on the sensitive layer, the hologram grating 3 is formed in the sensitive layer by developing the sensitive layer.

Then, the above-mentioned hologram dry plate 11 is bonded on its surface on which the hologram grating 3 is formed to a protecting base member 15 by means of the bonding agent 8, thereby a reflection type hologram scale 19 being produced. The protecting base member 15 is made of a transparent material such as glass or the like because it has to function as the side on which a light becomes incident.

In the reflection type hologram scale 19 thus produced according to the second embodiment of FIG. 3, the hologram grating 3 and the reflecting film 6 are respectively protected by the scale base member 12 and the protecting base member 15 so that the hologram grating 3 and the reflecting film 6 are prevented from being exposed to the air, thereby preventing the hologram grating 3 and the reflecting film 6 from being smudged by fingermarks and dusts and also from being scratched.

Figure 4:
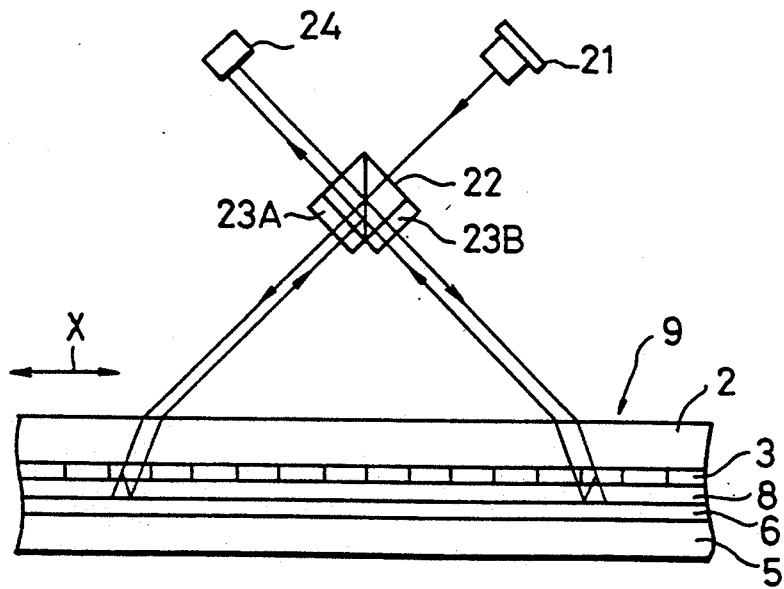
FIG. 4 is a schematic representation of an example such that the reflection type hologram scale shown in FIG. 2 is applied to a displacement detecting apparatus.

FIG. 4 shows an example such that the reflection type hologram scale 9 according to the first embodiment of FIG. 2 is applied to the displacement detecting apparatus. If the reflection type hologram scale 19 according to the second embodiment of FIG. 3 is similarly applied to the displacement detecting apparatus, then the reflection type hologram scale 9 may be replaced with the reflection type hologram scale 19. In this case, it is to be noted that, when the reflection type hologram scale 9 is selected, then a radiation light becomes incident on the scale base member 2 side, while when the reflection type hologram scale 19 is selected, a radiation light becomes incident on the protecting base member 15 side.

As FIG. 4 shows, a laser beam emitted from a semiconductor laser 21 is split into two laser beams by a polarizing beam split 22. The two laser beams thus splitted respectively travel through quarter wave plates 23A, 23B and become incident on the reflection type hologram scale 9. The incident laser beams are diffracted by the hologram grating 3 and the diffracted laser beams are reflected by the reflecting film 6. The diffracted laser beams thus reflected travel through the hologram grating 3, the quarter wave plates 23A, 23B and the polarizing beam splitter 22 and two interference beams become incident on a photo-detector 24. In this case, when the reflection type hologram scale 9 is moved in the direction shown by an arrow X, the interference beams detected by the photo-detector 24 are modulated on the basis of the grating pitch of the hologram grating 3, thus making it possible to measure the amount of movement of the reflection type hologram scale 9 in the X direction.

As set out, according to the first embodiment of the reflection type hologram scale of the present invention, since the hologram dry plate and the protecting base member are bonded while the hologram grating formed on the scale base member forming the hologram dry plate and the reflecting film formed on the base member forming the protecting base member are opposed to each other, the hologram grating and the reflecting film are respectively protected by means of the scale base member and the base member. Therefore, the hologram grating and the reflecting film are prevented from being exposed to the air, whereby the hologram grating and the reflecting film are protected from fingermarks, dust and scratches.

Furthermore, according to the second embodiment of the reflection type hologram scale of the present invention, since the reflecting film is formed on the scale base member forming the hologram dry plate and the protecting base member is bonded to the hologram grating formed on the reflecting film, the hologram grating and the reflecting film are respectively protected by the scale base member and the protecting base member. Therefore, the hologram grating and the reflecting film are prevented from being exposed to the air, thereby protecting the hologram grating and the reflecting film from fingermarks, dust and scratches.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

We claim as our invention

1. A system for detecting an amount of movement of a reflection type hologram scale, comprising:
   a hologram dry plate including a hologram grating formed on a first base member made of a transparent glass material;
   a bonding agent having an index of refraction substantially equal to an index of refraction of said first base member;
   a protecting member including a reflecting film formed on a second base member made of a material selected from the class consisting of glass and metal, wherein when said hologram dry plate is bonded to said protecting member by said bonding agent, said hologram dry plate having a surface on which said hologram grating is formed bonded by said bonding agent to a surface of said protecting member on which said reflecting film is formed;

a source of laser light including a beam splitter arranged proximate said hologram dry plate, whereby laser beams are incident on said hologram grating from the side of said first base member; and a photodetector arranged proximate said beam splitter, whereby the laser beams incident on said hologram grating from the side of said first base member are diffracted by said hologram grating, are reflected by said reflecting film, travel back through said hologram grating and said beam splitter, and become incident on said photodetector for performing movement detection.

2. A reflection type hologram scale according to claim 1, wherein said reflecting film is made of aluminum or chromium.

3. A system for detecting an amount of movement of a reflection type hologram scale, comprising:

a hologram dry plate including a reflecting film formed on a scale base member, and scale base member being made of a material selected from the class consisting of glass and metal, a photosensitive layer formed on said reflecting layer and a hologram grating formed on said photosensitive layer;

a protecting member formed of a transparent glass material;

a bonding agent having an index of refraction substantially equal to an index of refraction of said protecting member, whereby said hologram dry plate is bonded by said bonding agent on its surface on which said hologram grating is formed to said protecting member;

a source of laser light including a beam splitter arranged proximate said protecting member, whereby laser beams are incident on said hologram grating from the side of said protecting member; and a photodetector arranged proximate said beam splitter, whereby the laser beams incident on said hologram grating from the side of said protecting member are diffracted by said hologram grating, are reflected by said reflecting film, travel back through said hologram grating and said beam splitter, and become incident on said photodetector for performing movement detection.

4. A reflection type hologram scale according to claim 3, wherein said reflecting film is made of aluminum or chromium.

* * * * *

UNITED STATES PATENT AND TRADEMARK OFFICE
CERTIFICATE OF CORRECTION

PATENT NO. : 5,258,861
DATED : November 2, 1993
INVENTOR(S) : Hideki Tsuchiya

It is certified that error appears in the above-indentified patent and that said Letters Patent is hereby corrected as shown below:

ON THE TITLE PAGE:
Assignee, change "Sony Corporation" to --Sony Magnescale Inc.--
Col. 1, line 66, after "layer" delete ","

In the Claims:

Col. 5, line 25, change "and" to --said--

Signed and Sealed this

Fifteenth Day of August, 1995

Attest:

BRUCE LEHMAN

Attesting Officer   Commissioner of Patents and Trademarks